(12) United States Patent
Zilbertstein

(10) Patent No.: US 11,325,706 B2
(45) Date of Patent: May 10, 2022

(54) UNMANNED GLIDER SYSTEM FOR PAYLOAD DISPERSION

(71) Applicant: ALMOG RESCUE SYSTEMS LTD., Haifa (IL)

(72) Inventor: Ariel Zilbertstein, Giv'at Ada (IL)

(73) Assignee: ALMOG RESCUE SYSTEMS LTD, Haifa (IL)

( * ) Notice: Subject to any disclaimer, the term of this patent is extended or adjusted under 35 U.S.C. 154(b) by 211 days.

(21) Appl. No.: 16/580,263

(22) Filed: Sep. 24, 2019

(65) Prior Publication Data
US 2020/0031469 A1   Jan. 30, 2020

Related U.S. Application Data

(63) Continuation-in-part of application No. 15/503,470, filed as application No. PCT/IL2015/050820 on Aug. 11, 2015, now abandoned.

(30) Foreign Application Priority Data

Aug. 11, 2014   (IL) .......................................... 234058

(51) Int. Cl.
*B64C 39/04*       (2006.01)
*B64C 39/02*       (2006.01)
(Continued)

(52) U.S. Cl.
CPC ............ *B64C 39/024* (2013.01); *B64C 31/02* (2013.01); *B64D 1/10* (2013.01); *B64D 1/16* (2013.01);
(Continued)

(58) Field of Classification Search
CPC .............. B64C 31/02; B64C 2201/102; B64C 2201/128; B64C 2201/201;
(Continued)

(56) References Cited

U.S. PATENT DOCUMENTS

| | | |
|---|---|---|
| 1,317,551 A | 9/1919 | Chambers |
| 2,633,920 A | 4/1953 | Carlson |

(Continued)

FOREIGN PATENT DOCUMENTS

| | | |
|---|---|---|
| CN | 202508280 U | 10/2012 |
| DE | 4032672 A1 | 4/1992 |

(Continued)

OTHER PUBLICATIONS

"CH Robotics Wins Air Force Contract to Develop Drone Gliders," CH Robotics, Oct. 18, 2012 (1 page).

(Continued)

*Primary Examiner* — Philip J Bonzell
(74) *Attorney, Agent, or Firm* — Dorsey & Whitney LLP

(57) ABSTRACT

A disposable unmanned aerial glider (UAG) with predetermined UAG flight capabilities. The UAG comprises a flight module comprising at least one aerodynamic arrangement; and a fuselage module comprising a container configured for storing therein a payload and having structural integrity. The container is pressurized so as to maintain structural integrity thereof at least during flight, so that the UAG flight capabilities are provided only when the container is pressurized.

14 Claims, 12 Drawing Sheets

(51) Int. Cl.
*B64C 31/02* (2006.01)
*B64D 1/10* (2006.01)
*B64D 1/16* (2006.01)
*A62C 3/02* (2006.01)

(52) U.S. Cl.
CPC ...... *A62C 3/0228* (2013.01); *B64C 2201/128* (2013.01); *B64C 2201/201* (2013.01)

(58) Field of Classification Search
CPC ...... B64C 2201/206; B64D 1/10; B64D 1/16; B64D 5/00; B64D 1/18; A62C 3/0242; A62C 3/025
See application file for complete search history.

(56) References Cited

U.S. PATENT DOCUMENTS

| | | | |
|---|---|---|---|
| 3,382,800 A | 5/1968 | Biggs, Jr. | |
| 3,473,761 A | 10/1969 | Chutter | |
| 6,470,805 B1 | 10/2002 | Woodall et al. | |
| 7,121,353 B2 * | 10/2006 | Setzer | A62C 3/025 169/28 |
| 7,478,680 B2 | 1/2009 | Sridharan et al. | |
| 7,975,774 B2 | 7/2011 | Akcasu et al. | |
| 8,237,096 B1 | 8/2012 | Alexander et al. | |
| 8,948,935 B1 | 2/2015 | Patrick et al. | |
| 9,365,088 B2 | 6/2016 | Belik et al. | |
| 10,266,265 B2 * | 4/2019 | Wu | B05B 13/005 |
| 10,400,758 B2 * | 9/2019 | Bei | B64D 1/18 |
| 10,401,873 B2 | 9/2019 | Zilberstein et al. | |
| 2005/0006525 A1 | 1/2005 | Byers et al. | |
| 2006/0108477 A1 | 5/2006 | Helou et al. | |
| 2006/0162941 A1 | 7/2006 | Sridharan et al. | |
| 2007/0018033 A1 | 1/2007 | Fanucci et al. | |
| 2009/0205845 A1 | 8/2009 | Hoffman et al. | |
| 2009/0250229 A1 * | 10/2009 | Willner | A62C 31/00 169/53 |
| 2010/0314139 A1 * | 12/2010 | Jacobsen | A62C 5/004 169/46 |
| 2012/0138727 A1 | 6/2012 | Fisher | |
| 2012/0216697 A1 * | 8/2012 | Jacobsen | F41B 9/0046 102/439 |
| 2015/0336668 A1 | 11/2015 | Ubhi et al. | |
| 2016/0339280 A1 | 11/2016 | Sexton-Finck | |
| 2017/0129605 A1 * | 5/2017 | Wu | B64D 1/18 |
| 2017/0152843 A1 * | 6/2017 | Bei | B64D 1/18 |
| 2018/0354624 A1 * | 12/2018 | Liu | B64D 1/18 |
| 2019/0210726 A1 * | 7/2019 | Wu | B05B 12/02 |
| 2019/0376502 A1 * | 12/2019 | Bei | F04B 49/065 |

FOREIGN PATENT DOCUMENTS

| | | |
|---|---|---|
| DE | 102004034684 A1 | 2/2006 |
| KR | 101188294 B1 | 10/2012 |
| WO | 2011137335 A1 | 11/2011 |
| WO | 2013055265 A1 | 4/2013 |
| WO | 2016024276 A1 | 2/2016 |

OTHER PUBLICATIONS

"Chinese CM-506KG Small Diameter Precision Guided Glide Bomb," Nov. 15, 2012 (1 page).
"Precision Offset High Glide Aerial Delivery of Munitions, Equipment and Personnel," Remote Aerial Delivery System, retrieved Oct. 22, 2014 (2 pages).
"Projects: Glider Assisted Torpedo, NSTL Visakhapatnam," Prof. A.K. Ghosh Home Page (1 page).
"Sikorsky (/databased/manufacturer/4/) s-64 CH-54," website (4 pages).
"ULAV—Unmanned logistics air vehicles," Precision Aerial Delivery Systems, retrieved Oct. 22, 2014 (1 page).
International Search Report for International Application No. PCT/IL2015/050820, dated Dec. 13, 2015 (4 pages).
Written Opinion of the International Searching Authority for International Patent Application No. PCT/IL2015/050820, dated Dec. 13, 2015 (4 pages).

* cited by examiner

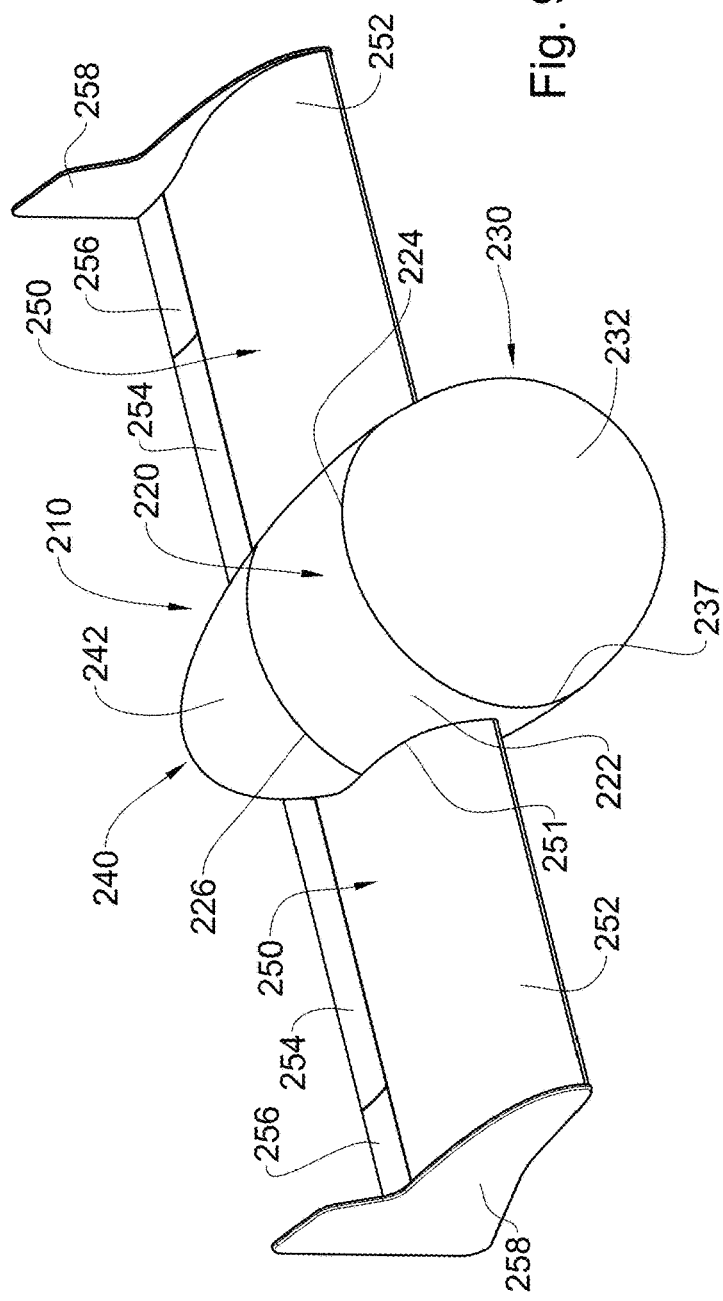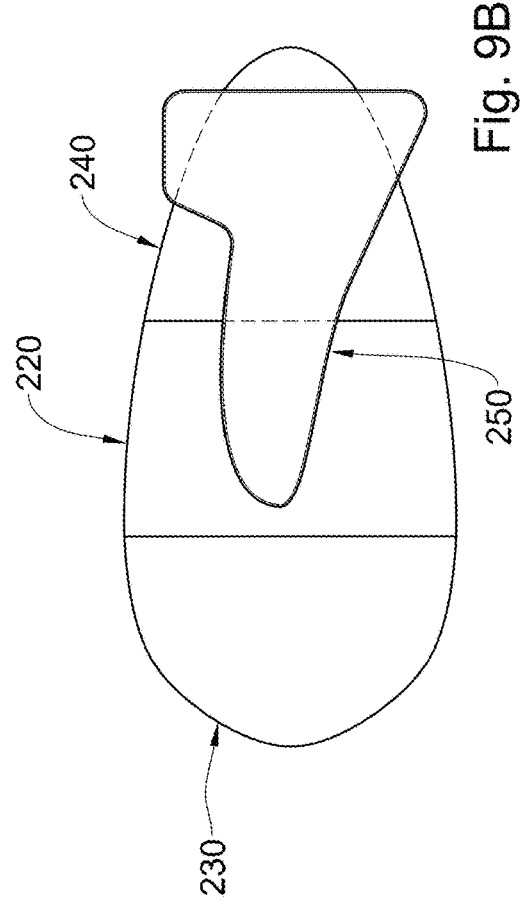

UNMANNED GLIDER SYSTEM FOR PAYLOAD DISPERSION

TECHNOLOGICAL FIELD

The invention relates to Unmanned Aerial Vehicles (UAV), in particular, unmanned gliders configured for being remotely operated across a desired area.

BACKGROUND

It is well known to use unmanned aerial vehicles in order to deliver payload to a predetermined area, and then either place the payload within that area or to disperse it therein.

Such unmanned aerial vehicles are used for a great variety of applications, mostly applications in which it is desirable to provide a payload to an area which is not accessible by human beings, and/or that the conditions in the area put humans in too great of a risk to deliver the payload.

Examples of such applications can be fire distinguishing UAVs configured for dispersing water and flame-retardant substances over a burning area (e.g. a forest fire), dispersion of pesticides, delivery of supplies (medical, food and otherwise) to inaccessible areas etc.

The UAVs described above can be roughly divided into two groups of UAVs:
  motorized UAVs—equipped with a motor and capable of flight on their own with full maneuvering capability; and
  non-motorizes UAVs—UAV lacking a motor which are configured for being dropped or deployed from a carrier.
  Non-motorized UAVs can still be equipped with maneuvering elements (ailerons, winglets etc.) allowing them some degree of maneuverability once deployed from the carrier.

Several examples of UAVs as described above are disclosed in publications listed below.

US2009/205845A discloses a method for extinguishing fires includes the steps of loading an unmanned aerial vehicle (UAV) onto a transport aircraft and carrying the UAV to an altitude and location in proximity to a fire area. The UAV is launched from the transport aircraft and guided over the fire area using controllable fixed or deployable aerodynamic structures operably connected to the UAV. Once over the appropriate location, the UAV releases fire extinguishing or retardant material onto the fire or anticipated fire path.

Aerovironment Hawkeye Unmanned Logistics Aerial Vehicle (ULAV) is a tandem wing glider designed to covertly deliver critical payloads to ground personnel. It is designed for standoff, high-altitude, air launched deployment. This expendable glider is designed to fly autonomously or under remotely piloted, reaching its payload delivery point with high precision (Marked by FF).

U.S. Pat. No. 8,237,096 discloses an apparatus and methods provide a kit for converting a conventional mortar round into a glide bomb. Mortar rounds are readily available to combat personnel and are small and light enough to be carried by relatively small unmanned aerial vehicles (UAVs) such as the RQ-7 Shadow. Advantageously, the kit provides both guidance and relatively good standoff range for the UAV such that the kit-equipped mortar round can be dropped a safe distance away from the intended target so that the UAV is not easily observed near the intended target.

US2007/018033 discloses an aerial deliver system mounts a payload to an air delivery vehicle for aerial deployment by air into water from a location remote from the target region. The air delivery vehicle includes deployable wings and tail fins for gliding or powered flight to a target region. A release mechanism between the air delivery vehicle and the payload provides a clean separation between the two.

US2012138727 discloses a sonar buoy which includes a fuselage having a tube-like shape, one or more wings coupled to the fuselage, an engine coupled to the fuselage and operable to propel the sonar buoy through flight, and a guidance computer operable to direct the sonar buoy to a predetermined location. The sonar buoy further includes a sonar detachably coupled to the fuselage and forming at least a part of the fuselage, and a rocket motor detachably coupled to the fuselage. The one or more wings are operable to be folded into a position to allow the sonar buoy to be disposed within a launch tube coupled to a vehicle and to automatically deploy to an appropriate position for flight after the sonar buoy is launched from the launch tube. The rocket motor propels the sonar buoy from the launch tube and detaches from the fuselage after launch.

There is also known a transport helicopter, the Sikorsky s-64 CH-54, which is a twin-engine heavy-lift helicopter designed as an enlarged version of the prototype Flying Crane S-60, and comprise merely a helicopter skeleton configured for attachment thereto of a transport container, serving as its fuselage.

Acknowledgement of the above references herein is not to be inferred as meaning that these are in any way relevant to the patentability of the presently disclosed subject matter.

GENERAL DESCRIPTION

According to a first aspect of the subject matter of the present application there is provides a disposable unmanned aerial glider (UAG) with pre-determined UAG flight capabilities, the UAG comprising a flight module comprising at least one aerodynamic arrangement; and a fuselage module comprising a container configured for storing therein a payload and having structural integrity, said container being pressurized so as to maintain structural integrity thereof at least during flight, so that said UAG flight capabilities are provided only when the container is pressurized.

The term 'flight' used herein should be understood as referring to the movement of objects through an atmosphere in a manner generating lift. In other words, objects moving under a simple ballistic trajectory cannot be considered as having 'flight capabilities' under the present application.

The flight module can comprise a majority of aeronautical and avionic components required for flight of the UAG, e.g. wing/aerial arrangement, navigation equipment, telemetry, communication etc., providing the flight module with initial flight capabilities, which do not meet the requirements of the UAG flight capabilities, and are usually inferior thereto.

Under the above arrangement, the flight module can be attached to any one of a variety of fuselage modules, designed for different applications of the UAG, each of which can define its specific UAG flight capabilities. Alternatively, the flight module and fuselage module can be integrated with one another.

Per the first example above, when the fuselage module and flight module are not integrated with one another, the fuselage module can be configured for selective detachment from the flight module during operation, for example, when reaching its target.

For example, if the UAG is intended for fire extinguishing purposes, the fuselage can be a fire-extinguishing fuselage containing therein corresponding materials, wherein its attachment to the flight module forms a fire-extinguishing UAG. If, on the other hand, the UAG is intended for dispersion of electronic elements over a certain area (e.g. to gather data regarding certain climatic, pollution and/or other conditions, detecting the presence of pests and even evaluating the condition of crops), then the fuselage can contain said electronic elements, its attachment to the flight module forming a specific UAG making use of these artifacts. In both cases, the fuselage modules make use of identical flight modules, as described above.

It is appreciated that the flight capabilities required for the fire-extinguishing and provided by the combination of a fire-extinguishing fuselage and the flight module may differ from the flight capabilities required for dispersion of electronic elements and provided by the combination of a fuselage filled with electronic components and the flight module.

Under a particular design, the payload can be received within the container at a predetermined positive pressure contributing to the structural integrity of the fuselage module, especially during flight. For the example, the pressure can be in the range of 3 to 10 bars.

Specifically, the arrangement can be such that the container is a thin-walled structure, which, without the presence of pressurized payload therein, is of lower structural integrity, i.e. is incapable of maintaining the same structural integrity as the filled fuselage, at least during flight.

It is understood that the comparison of 'structural integrity' between two configurations is directed the ability of a certain configuration to withstand certain loads. In particular, while the fuselage with the pressurized payload has a certain structural integrity allowing it to withstand certain loads during flight, whereas an empty fuselage is unable to withstand the same loads, and therefore is considered to have a lower structural integrity.

The ratio between the weight of the container and the weight of the payload can be 1:10, more particularly 1:50, and even more particularly 1:100.

The weight of the payload and container itself can be designed according to overall weight/mass requirements of the UAG in order to contribute to the desired UAG flight capabilities.

The thin-walled container can be made of disposable materials, including at least any of the following: cardboard, wood, glass and ceramic.

Under the above arrangement, the pressurized payload within the fuselage module facilitates, on the one hand, maintaining the structural integrity of the container, and, on the other hand, assists in the dispersion of the payload from the container when so required.

It should also be noted that the pressurized payload as described above allows the container to be of a thin-wall type, while still maintaining its structural integrity and thereby provides inter alia the following advantages:
  it allows reducing the amount of material required for manufacturing the fuselage module, and subsequently the costs thereof; and
- it allows for the payload of a greater volume/weight to be received within the container, when compared to a thicker-walled container which is configured to maintain structural integrity even without the presence of a pressurized payload.

In accordance with a particular design, the container can be configured to have an operative state in which it is configured for accommodating the payload, and a folded state, allowing, for example, efficient use of space for transport purposes. Furthermore, from the folded state, the container can assume its operative state by pressurizing thereof.

According to one example, the container can be collapsible and made of rigid panels which are connected to each other but are in a folded position, wherein switching from the folded position to the operative position is performed by changing the orientation between the panels. Alternatively, according to another example, the container can be configured for being inflatable, wherein switching to the operative state is performed by pressurizing the container.

Under a particular design variation, the container can have a volume, a majority of which is occupied by the fuselage module, and, even more particularly, can constitute the entire fuselage module.

It should be noted that the dispersion of the payload from the fuselage module can be of a multistage dispersion mode, allowing partial dispersion of payload in each stage. The dispersion mechanism can be based on a time delay concept.

More than one type of container can be involved in the dispersion of more than one type of material, aiming to increase the dispersion impact.

The fuselage can have a dispersion mechanism configured for providing and implementing the proper dispersion mode of the UAG. The dispersion mechanism can be at least one of the following:

- a nozzle-type arrangement (can include more that one nozzle);
- a collapse arrangement under which dispersion occurs when mechanical collapse takes place either when the fuselage is plastically impacted an obstacle or when one or more of physical conditions of the container are measured above the threshold; and
- an open-door mechanism.

The container of the present application is configured for dispersing the material in extreme environment condition like 1000 C, wind of 100 Knots, bio chemical radiated environment, etc.

In accordance with one design embodiment, the UAG can be provided with floating, cruise and material dispersion capabilities for marine applications. For this, as well as other, purposes, some containers can comprise propulsion capabilities enabling them to move/navigate the container when the UAG (or the container when detached from the flight module) are no longer in flight.

In regards to the particular example above, the fuselage module can be provided with such capabilities allowing the container to float and cruise in the water for marine application, after it has landed. It is however important to note that such propulsion capabilities do not transform the UAG (glide-based) into a propelled aircraft, but rather allow some degree of maneuvering when the UAG has already finished its flight stage.

In accordance with a specific design embodiment, the fuselage module can comprise an avionic cell, a forward payload chamber and a rear payload chamber. The main avionic cell can comprise a hollow configured for accommodating therein equipment required at least for controlling the flight of the UAG and for the dispersion of payload.

Each of the front payload chamber and rear payload chamber can be defined by a shell having a domed shape, each chamber being configured for containing therein the payload P. The shell of at least one of the front payload chamber and rear payload chamber can be in the form of a flexible diaphragm, which assumes its domed shape once it is filled with the payload and properly pressurized.

When the flexible diaphragm shell is not filled with payload and/or pressurized thereby, it can assume a collapsed or folded state, thereby considerably reducing required storage space. According to a particular example, the collapsed diaphragm can even be inverted into a hollow of the avionic cell, when the diaphragm is not in use.

The fuselage can comprise two filling valves configured for introducing payload into the front payload chamber and rear payload chamber respectively. These two valves can also be associated with a mutual filling valve formed in the avionic cell and allowing filling and pressurizing of both payload chambers via a single valve.

The avionic cell can also accommodate an accumulator, a dispersion control unit and a flight control unit.

The accumulator can comprise an inflator cell containing therein a pressurized gas g, and is associated with the dispersion control unit and with a front inflation port and a rear inflation port.

In operation, upon being prompted by the dispersion control unit, the inflator cell can be configured to rapidly release (e.g. at approx. 300 liters within 300-500 milliseconds) the compressed gas g into the inflation ports allowing it to expand (to a state G) within the payload chambers. Such rapid expansion is facilitated by the compressed gas being pressured to a suitable pressure. The rapid expansion of the gas pushes out the pressurized payload P through the dispersion outlets, allowing the payload to be discharged from the UAG to a distance of tens of meters, between 10 m to 50 m, more particularly between 15 m to 25 m. Such discharge can create a dispersion area around the UAG with a diameter of between 20 m to 100 m, more particularly, 30 m to 50 m respectively.

According to one example, the pressure of the expanding gas G can increase from the center outwardly as and push the payload P, which inevitably has to be discharged through the dispersion outlets. The gas can be of any suitable type, e.g. it can be Nitrogen or the like, or CO2.

However, under another arrangement, each of the shells of the payload chambers can also comprise a flexible inner layer defining intermediate inflation spaces for each of the chambers. The arrangement can be such that each payload chamber comprises at least one inflation port associated with the inflation space.

Thus, contrary to the previous example, in operation, once the inflator cell releases its pressurized gas g into the inflation ports, the expanded gas G presses inwardly towards the center of each payload chamber, thereby forcing the pressurized payload P through the dispersion outlets.

Each of the units can be provided with a communication arrangement allowing it to wirelessly communicate with a control center (e.g. a computer program, application, ground control etc.).

According to a particular design variation, the flight module can comprise a wing foldable with respect to the fuselage module when attached thereto in order to have a first, folded state for storing of the UAG when not in operation, and a second, deployed state for operation of the UAG.

According to a specific example, the fuselage module has a longitudinal axis, and in said first, folded state, the wing extends along said axis while in said second, deployed state, the wing extends generally transverse to said longitudinal axis. The wing can also be configured to switch from its folded state to its unfolded state when the UAG is in operation (i.e. not in storage).

Per the above, the dimensions of the wing can be designed according to the dimensions of the fuselage module, such that in the folded state, the wing does not exceed at least one of dimensions of the fuselage module. It should be understood here that the term 'wing' can refer to any aerodynamic element of the UAG creating lift. Specifically, the UAG can comprise two foldable wings, each not exceeding the length of the fuselage module, but when unfolded simultaneously, provide a combined wingspan which does exceed the length dimensions of the fuselage module.

According to a particular example, each wing can have a geometry which slopes downwards towards the rear of the UAG. This curvature, aside from it aeronautic advantages, can also provide an advantage with regards to stacking of the UAGs.

The unique geometry of the UAG is such that allows a compact stacking of a plurality of such UAGs, at least during transport. Specifically, the UAGs can be stacked one on top of the other so that one the wing of one UAG serves as a resting surface for the fuselage of its top neighboring UAG. In turn, the wing of the second UAG serves as a resting surface for the fuselage of its top neighboring UAG and so on. Owing to the geometry of the wings and of the fuselage, a compact stacking of the UAGs is achieved.

Under this arrangement, each two neighboring UAGs can be horizontally offset a distance D with respect to one another, D being roughly in the range of the largest cross-sectional diameter of the fuselage of the UAG. The vertical distance between two neighboring UAGs can be H, which is roughly the equivalent of about 0.5 D to 0.75 D.

According to another example, the UAGs can also be arranged hanging from carrier rails CR via the rear dome 242 thereof. Specifically, a similar spatial arrangement of the UAGs can be maintained as in the previous example, but such that the UAGs are suspended from carrier rails allowing them to travel along the rails for easy deployment.

It is appreciated that both of the above examples refer to stacking of UAGs in which the wings on which the rests alternates between right and left. However, under different storage requirements it may be more beneficial to diagonally stack the UAGs so that each UAG rests always on the same wing (either left or right), thereby forming a diagonal stack.

At least a part of the UAG or the entire UAG can be configured to be disposable, i.e. both the fuselage module and the flight module are not required to be retrieved after the payload has been discharged and/or the decent/landing of the UAG.

In addition, one or more components of the UAG or alternatively the entire UAG, except for its electronic components, can be made of disposable materials, such as cardboard, wood etc.

The flight module can further comprise a maneuvering arrangement controllable by an avionics module, effective for maneuvering the UAG during its flight.

According to another aspect of the subject matter of the present application, there is provided a storage device configured for accommodating therein a plurality of UAGs, said storage device being configured for controllable release of UAGs therefrom. The storage device can be configured for mounting onto a carrier from which the UAG's are to be discharged (e.g. airplane, high-tower, mountain-top etc.).

The storage device can have a regulating arrangement configured for the controlled release of the UAGs, and a control arrangement effective for performing at least the following:

- receiving data regarding release of the UAGs therefrom;
- controlling the regulating arrangement in order to release the UAGs therefrom in a predetermined sequence/order; and monitoring the release of the UAGs in order to keep track of which UAGs have been released and which are still received within the storage device.

Under one design embodiment, the storage device can be a rigid structure, similar to a cage, configured for receiving therein the UAGs, and wherein release of the UAG's from the cage is performed by controlling a selective stopper release mechanism.

According to one example, the stopper release mechanism can be a single stopper release mechanism used for the entire set of UAGs. For instance, the release mechanism can be a simple door which is effective to selectively open/close based on instructions from the control unit and regulating arrangement.

Under another design embodiment, the storage device can be a flexible structure configured for receiving therein the UAGs, and assume a first, unfolded state in which the UAGs can be mounted to or released from the storage device and a second, folded state, in which the storage device is configured for compact storage, while holding therein the UAGs. The storage device can also assume a plurality of intermediate states between the first and the second state.

Under the above arrangement, release of the UAGs from the storage device takes place by gradual shifting of the storage device from the folded state to the unfolded state. With each portion of the storage device being unfolded, additional UAGs can be released therefrom.

In connection with the above, under a particular example, the storage device is not disposable, and so it further comprises navigation and landing means configured for safely landing it at a desired location to be retrieved after completing its mission.

According to a further aspect of the subject matter of the present application, therefrom is provided a disposable unmanned aerial glider (UAG) with pre-determined UAG flight capabilities, the UAG comprising a flight module comprising at least one aerodynamic arrangement; and a fuselage module comprising a container configured for storing therein a payload at a predetermined positive pressure contributing, on the one hand, to the structural integrity of the fuselage module, especially during flight, and, on the other hand, to the capability of dispersing said payload from the container.

A UAG according to any of the above aspects can be provided with advantageous functionalities compared to traditional UAVs, such as e.g. being foldable in storage, inflated in operation and being biodegradable after use. According to another aspect of the subject matter of the present application, there is provided a plurality of UAGs according to the previous aspects and a control system configured for monitoring, controlling, navigating and regulating the UAGs.

Such system can comprise any of the following properties:
  a video camera installed on the container in order to film the flight track and the dispersion effect;
  the capability to identify technical failures and flight plan deviation;
  the capability to self survived mechanism when technical failures is identified; and
  the capability to self survived mechanism when flight plan deviation is identified.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 9A is a schematic isometric view of another example of a UAG according to the present application;

FIGS. 9B to 9E are schematic respective side, top, front and rear views of the UAG shown in FIG. 9A;

DETAILED DESCRIPTION OF EMBODIMENTS

Figure 1:
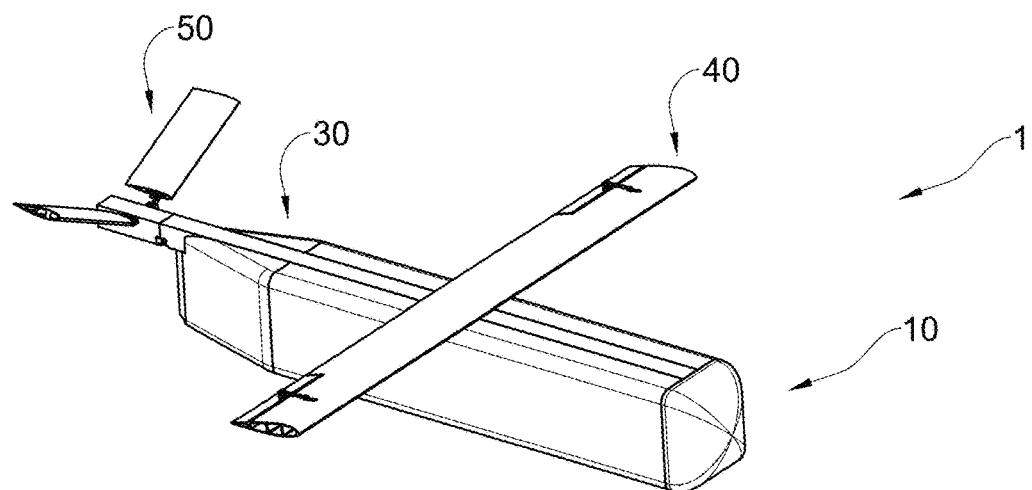
FIG. 1 is a schematic isometric view of a UAG according to the subject matter of the present application, in its deployed state.

Attention is first drawn to FIG. 1, in which an unmanned aerial glider (UAG) is shown, generally designated 1 and comprising a fuselage module 10, and a flight module 30 comprising a main flight arrangement in the form of a main wing 40 and a rear wing unit 50. The UAG 1 is shown in its deployed state, i.e. in an operational condition.

Figure 2A:
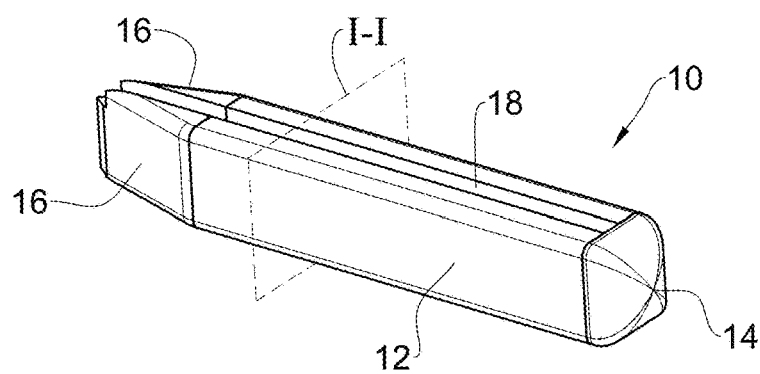
FIG. 2A is a schematic isometric view of a fuselage of the UAG shown in FIG. 1.
Figure 2B:
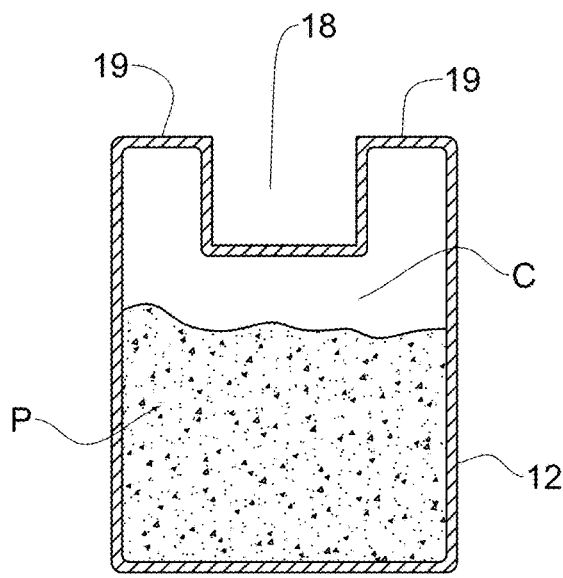
FIG. 2B is a schematic cross-section view taken along plane I-I shown in FIG. 2A.

Turning now to FIGS. 2A and 2B, the fuselage module 10 is in the form of an elongated body 12 having a front end 14 and a rear tapered end 16. The body 12 is hollow, comprising a cavity C configured for containing therein the payload to be dispersed.

With reference to FIG. 2B, the fuselage body 12 is of a thin-walled structure 13, and the payload P is introduced therein under sufficient pressure so as to facilitate the thin-walled structure 13 to withstand all the static and dynamic loads exerted on the fuselage body 12 during flight of the UAG 1.

The fuselage body 12 further comprises a longitudinal slot 18 configured for accommodating therein a portion of the flight module 30 for the purpose of its mounting onto the fuselage module 10. The slot 18 is bounded by two side ridges 19 of the fuselage 12.

Figure 3A:
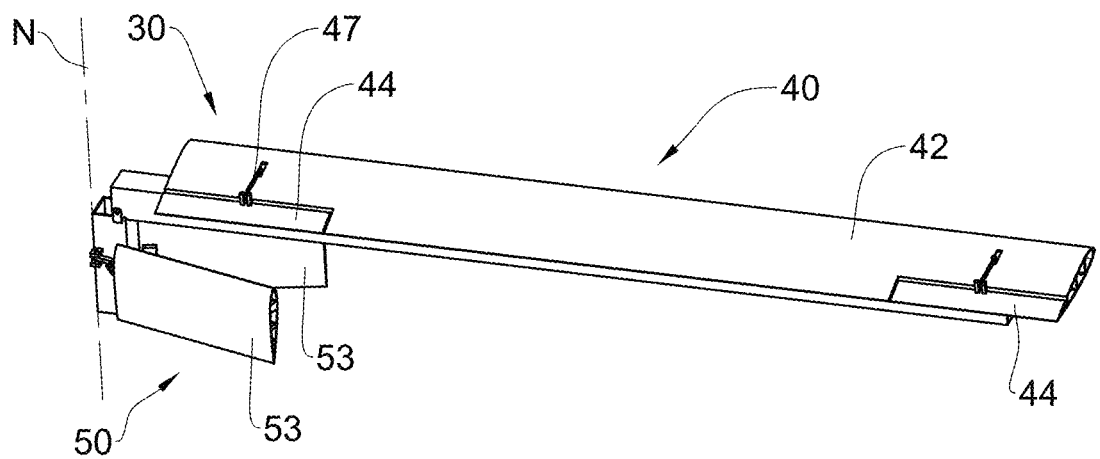
FIG. 3A is a schematic isometric view of a flight module of the UAG shown in FIG. 1, shown in its folded state.
Figure 3B:
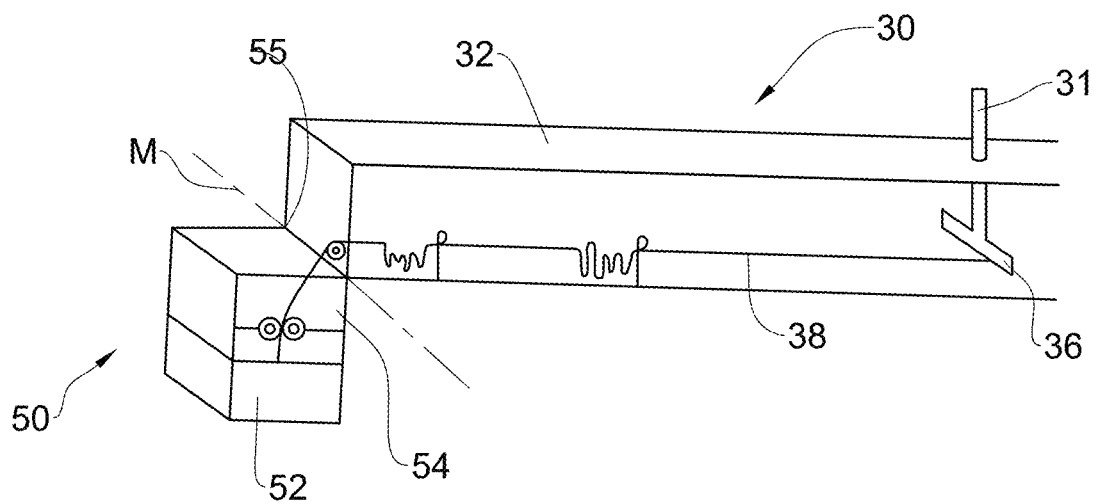
FIG. 3B is a schematic isometric view of a rear wing unit of the flight module shown in FIG. 3A.

Attention is now drawn to FIGS. 3A and 3B, in which the flight module 30 is shown comprising a longitudinally extending body 32 provided with a pivotal T-bar having a central axle 34 and a lateral bar 36, the central axle being configured for mounting thereon the main wing 40.

Figure 4A:
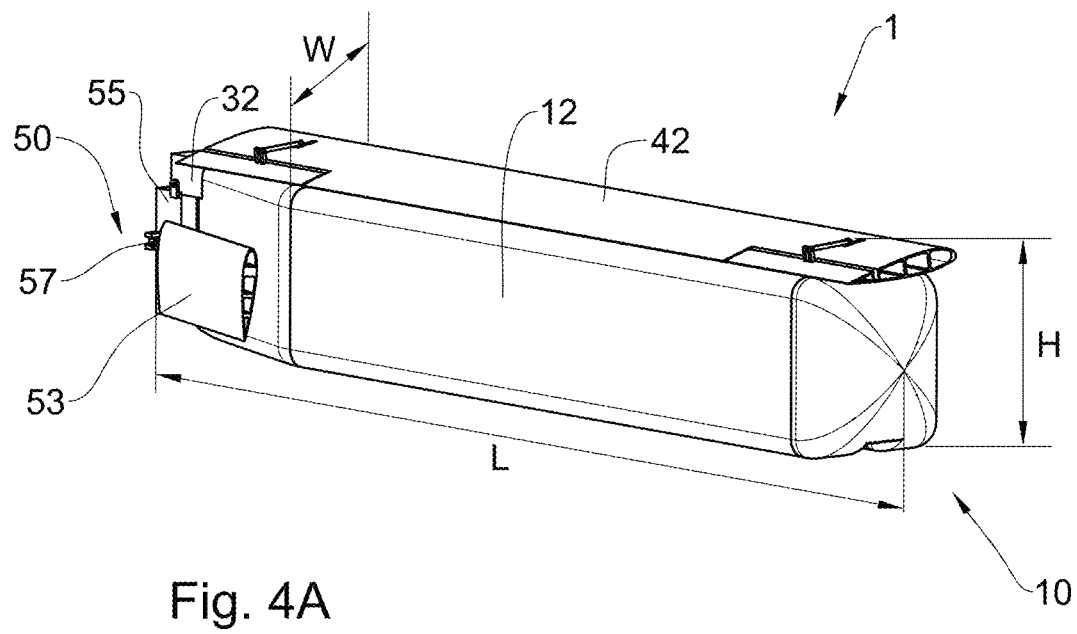
FIG. 4A is a schematic isometric view of the UAG shown in FIG. 1 in its folded state.
Figure 4B:
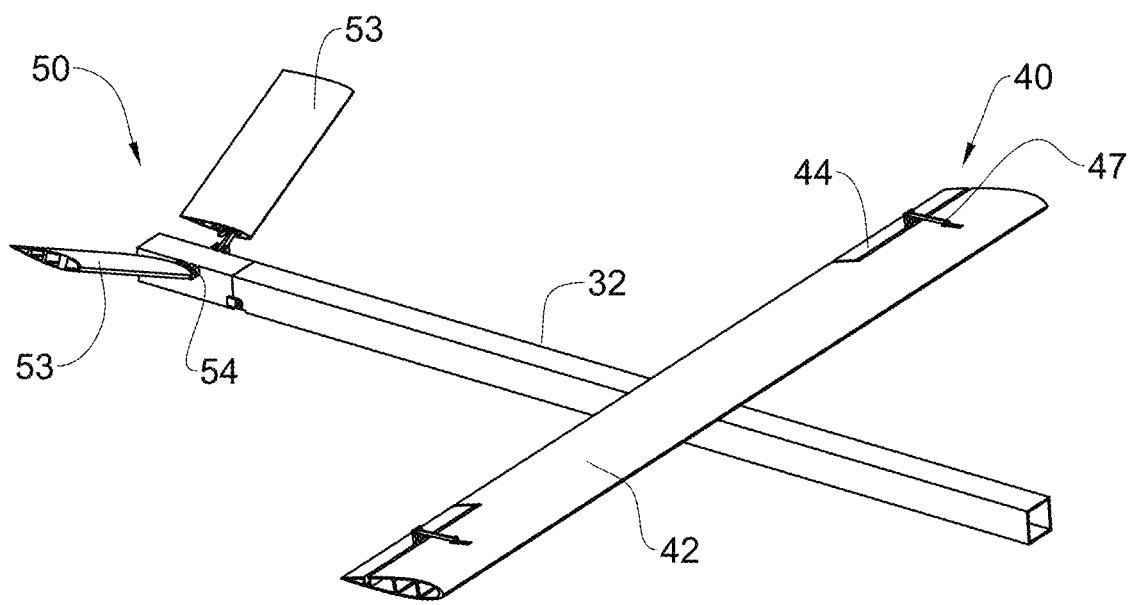
FIG. 4B is a schematic isometric view of the flight module show in FIG. 3A, in its unfolded state.

With additional reference being made to FIGS. 4A and 4B, the main wing 40 is in the form of a wing body 42 comprising two ailerons 44, one at each end thereof, and has a base port (not shown) configured for mounting of the wing body 42 onto the base axle 34, so as to allow it to perform a pivotal motion about the axis of the axle 34 for the purpose of its deployment. The ailerons are individually controlled by a set of levers 47.

The rear wing unit 50 is pivotally attached to a rear end of the body 32, and comprises the winglets 53, a compartment 52 and a deployment mechanism 54. The winglets 53 are pivotally attached to the compartment 52 via hinge 57, so that in a folded position (see FIG. 4A), the winglets 53 can be flush against a tapering end 16 of the fuselage module 10.

As shown in FIG. 3B, the deployment mechanism 54 is mechanically associated with the T-bar and is configured for revolving it about the axle 34, in order to bring the wing body 42 from a folded position in which it extends generally parallel to the module 10, to a position generally perpendicular thereto (as shown in FIG. 1).

The compartment 52 accommodates a utility parachute which is configured for pulling up the rear wing unit 50 (about its pivot point) in order to bring it to the deployed position shown in FIG. 1. The body of the flight module 32 and the compartment 52 can also comprise stabilization and additional parachutes, mechanical arrangements for activating electronic equipment, opening parachutes, regulating aerodynamic surfaces of the wing body 42. It can also accommodate standard electronic equipment such as a battery, servo motors, sensors, in-flight computer, range meter, GPS sensors and communication components.

A UAG according to the presently disclosed subject matter can be configured for being dispensed from an aerial carrier (e.g. helicopter, gyrocopter, airplane, high drone e.g. a multi-rotor drone, etc.) and be deployed during dispensing or in mid air in order to assume an operational state. Such carrier can be configured to operate as a vertical elevator to dispatch the UAGs from a single operational site. Each UAG can comprise a mechanical mechanism configured to provide fast deployment thereof.

Figure 5A:
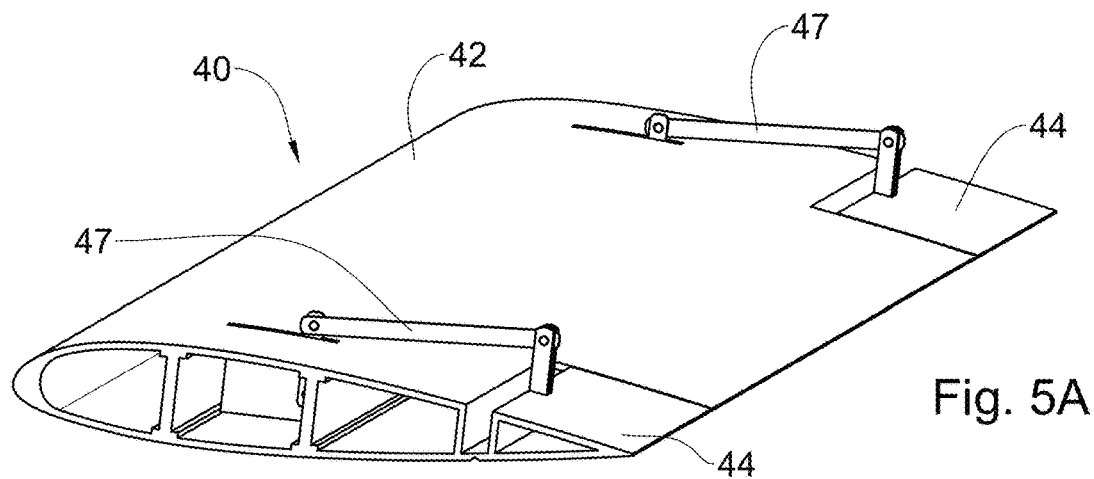
FIG. 5A is a schematic isometric view of a wing used in the flight module.
Figure 5B:
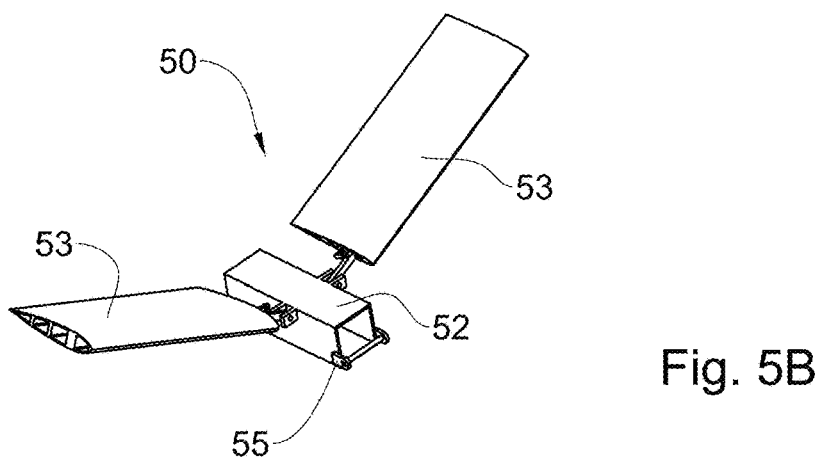
FIG. 5B is a schematic isometric view of the rear wing unit, in its unfolded state.
Figure 5C:
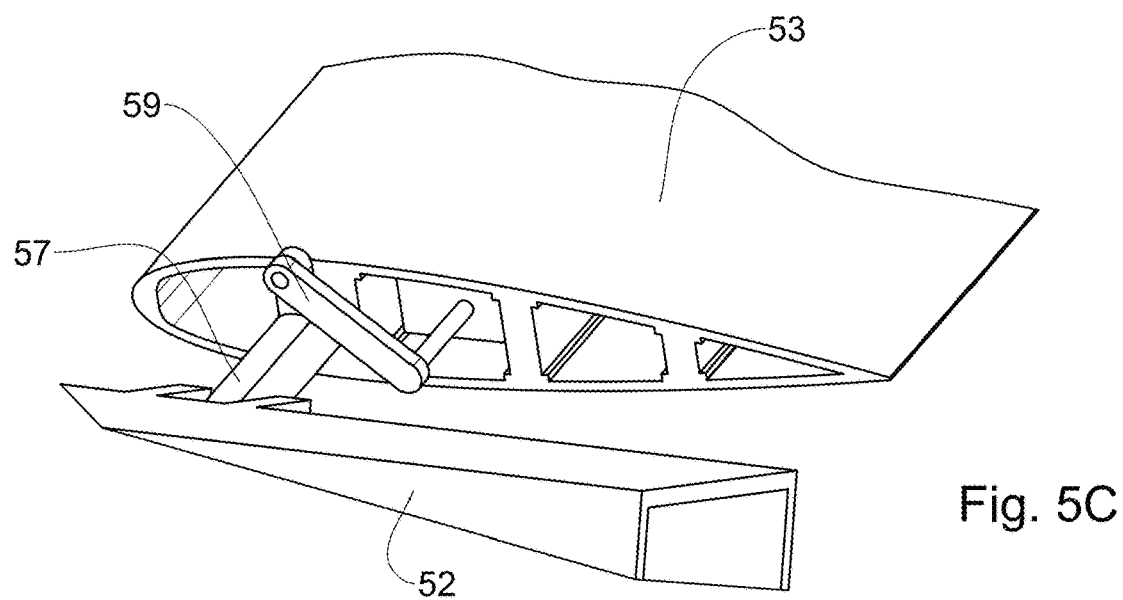
FIG. 5C is an enlarged isometric view of a winglet of the rear wing unit.
Figure 6A:
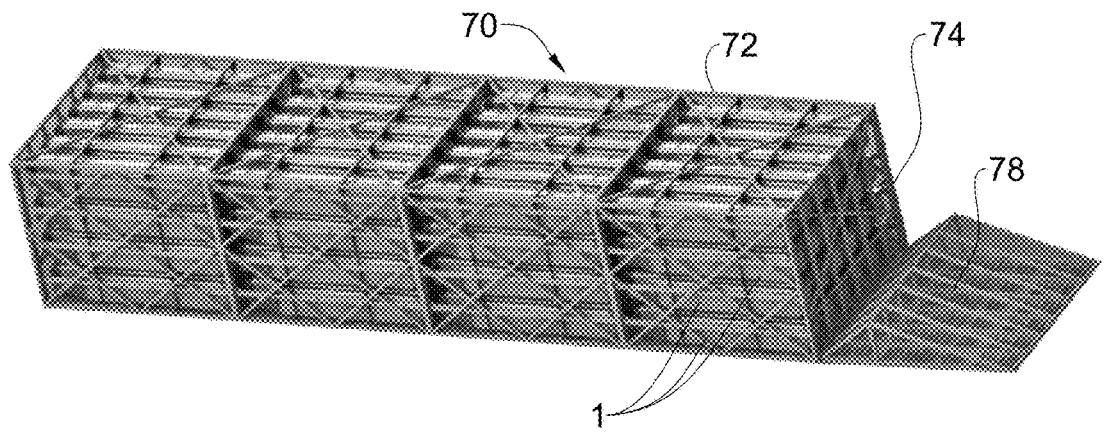
FIG. 6A is a schematic isometric view of a rigid storage unit for a plurality of UAGs as shown in FIGS. 1 to 5C.
Figure 6B:
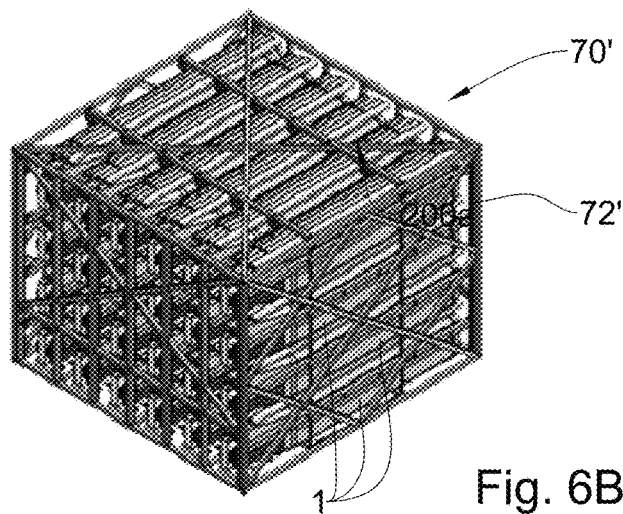
FIG. 6B is a schematic isometric view of another example of a rigid storage unit for a plurality of UAGs as shown in FIGS. 1 to 5C.
Figure 6C:
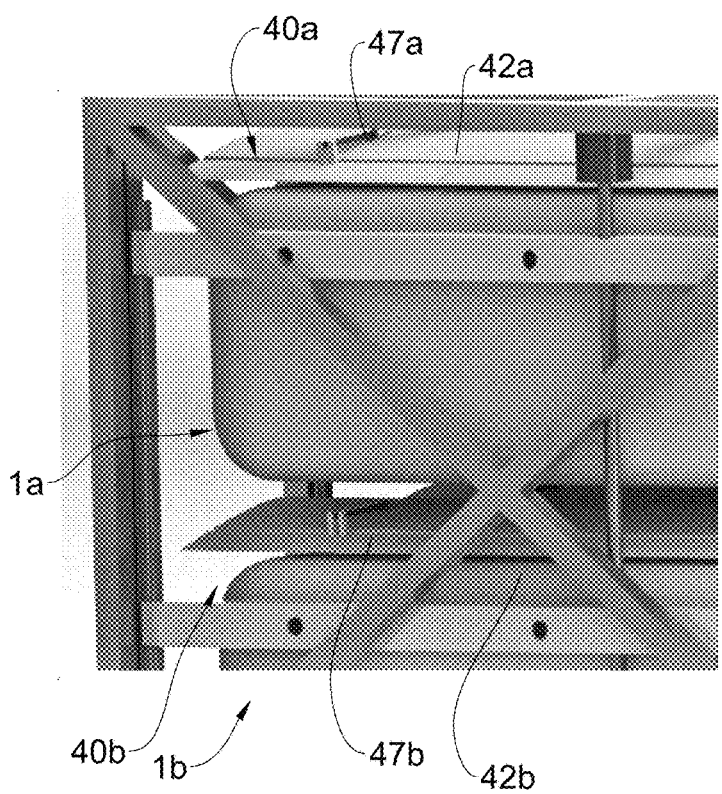
FIG. 6C is a schematic isometric enlarged view of a portion of the storage unit shown in FIG. 6B.
Figure 7B:
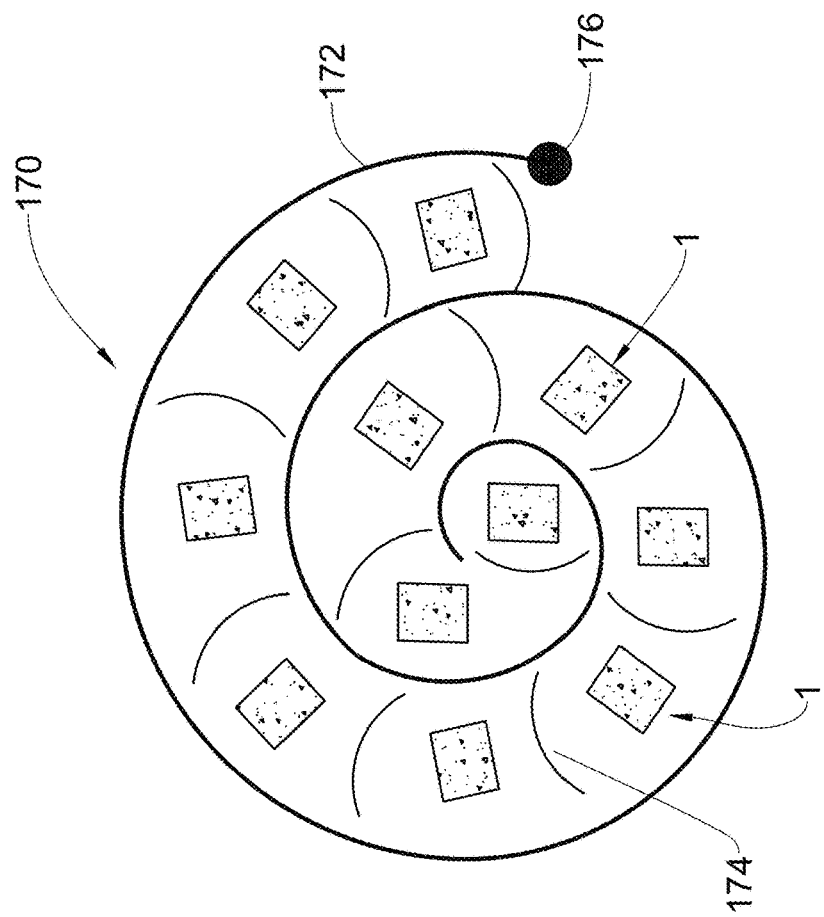
FIG. 7B is a schematic side view of the storage unit shown in FIG. 7A.
Figure 7A:
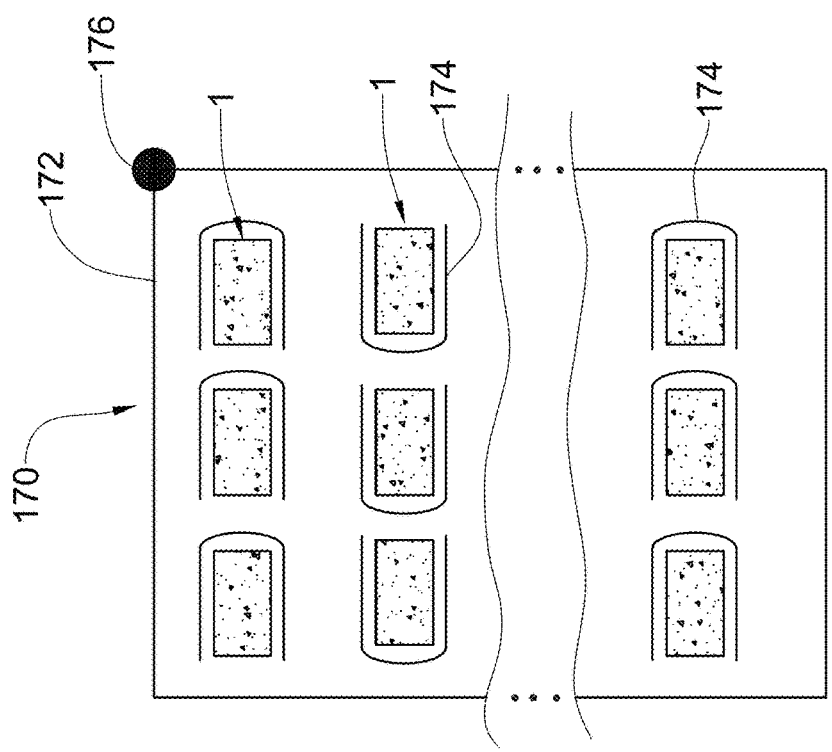
FIG. 7A is a schematic front view of a flexible storage unit for a plurality of UAGs as shown in FIGS. 1 to 5C, in its unfolded state.

With additional reference being made to FIGS. 5A to 5C, in operation, when dispensed, the parachute stored in the compartment 52 deploys, entailing a chain reaction in which the rear wing unit 50 is first aligned with the body 32 of the flight module 30 by performing pivotal motion about the axis M via hinge 55. Thereafter, the winglets 53 perform pivotal motion about their respective axes N via hinge 57 in order to assume the position shown in FIG. 1, following which the deployment mechanism 54 rotates the main wing body 42 to a perpendicular position with respect to the longitudinal axis of the fuselage module 10. Finally, the parachute is discarded and the UAG is ready for operation.

Reverting now to FIGS. 4A and 4B, when the UAG 1 is in its folded position, it can be stored for safe keeping (i.e. in storage when no in operation), and or within a portable storage device configured for being carried by an aircraft, just before launch/dispensing of the UAG 1.

The UAG 1 is required to have certain flight capabilities and meet certain criteria in order for it to fulfill its function. These are determined by the purpose for which the UAG 1 is designed. In the particular example discussed below, the UAG 1 is configured for fire-fighting purposes, and the design considerations and parameters are derived from that specific application.

More particularly, a UAG according to the presently disclosed subject matter can be configured to knock down hotspots at the accuracy of 10-20 meters even under extreme environment conditions including the temperature of 1,000° C. and above.

For this specific application, it is required that at least the fuselage module 10 of the UAG 1 is made of disposable materials allowing the UAG 1 to eventually crash at the site of the fire and be consumed thereby. The main parameters of the UAG to be considered can be its gliding ratio (the number of units length it travels in the horizontal direction with respect to the number of units length it travels in the vertical direction, also expressed as an L/D ratio), its payload weight and volume and desired aerial velocity. In general, a UAG according to the presently disclosed subject matter can be configured to carry 100-500 liters of a payload and to spray it in rain-like fashion for efficient heat absorbance, while safely disintegrating into small, easily decomposing parts of 1-10 mm in diameter. It can be made at least partially of a plastic material that is biobased and biodegradable after use, such as PLA and PHA or PBS, or plastics that is based on fossil resources and is biodegradable, such as PBAT. The glider can meet environmental standards like EN 13432 and EN 149951. It can be configured to leave, after use, less than 0.3% of the amount of non-friendly materials on the ground, out of initial mass.

In addition, it is required that the UAG 1 has a gliding ratio of 1:4 to 1:10, i.e. for every unit length of height, the UAG 1 can glide for between 4 to 10 units length in distance. For example, if the UAG 1 is dropped from 22,000 feet, it should be able to glide for approximately 30 miles. In addition, the UAG 1 is configured for carrying a payload of between 100 to 600 liters.

Based on these two parameters, the design of the flight module 30 can be determined, in particular, the design of the wing body 42. Specifically, the considerations are as follows:

The arrangement is such that the span of the wing S is commensurate to the length of the fuselage module L, where S≤L and the width of the wing K is commensurate to the width of the fuselage module W, where K≤W. It is appreciated that L and W are parameters determining the volume of the fuselage module 10, and are dictated by the payload requirements previously mentioned.

Following the above, further requirements can be determined in order to define the airfoil geometry of the wing. For example, the gliding speed can be determined to be over 50 knots, and the L/D (lift to drag) ratio can also be determined based on the gliding ratio.

Following the above, and subject to various load considerations (making sure the wing can withstand the loads exerted thereon during flight and that it does not go into vibration). Similarly, the geometry of the winglets 53 can also be determined.

In addition to the above considerations, the design of the UAG should take into account the dispensing process, in particular, making sure that when dispensed, the UAG 1 is not thrown out of the carrier and lifted upwards, which may cause it to impact important components of the carrier aircraft.

Figure 8A:
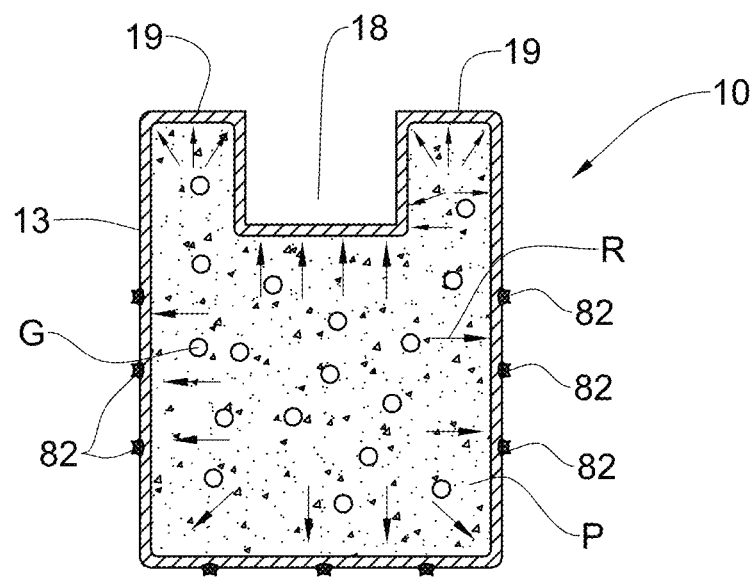
FIG. 8A is a schematic cross-section view of a fuselage used in the UAG shown in FIG. 1, shown pressurized during flight.
Figure 8B:
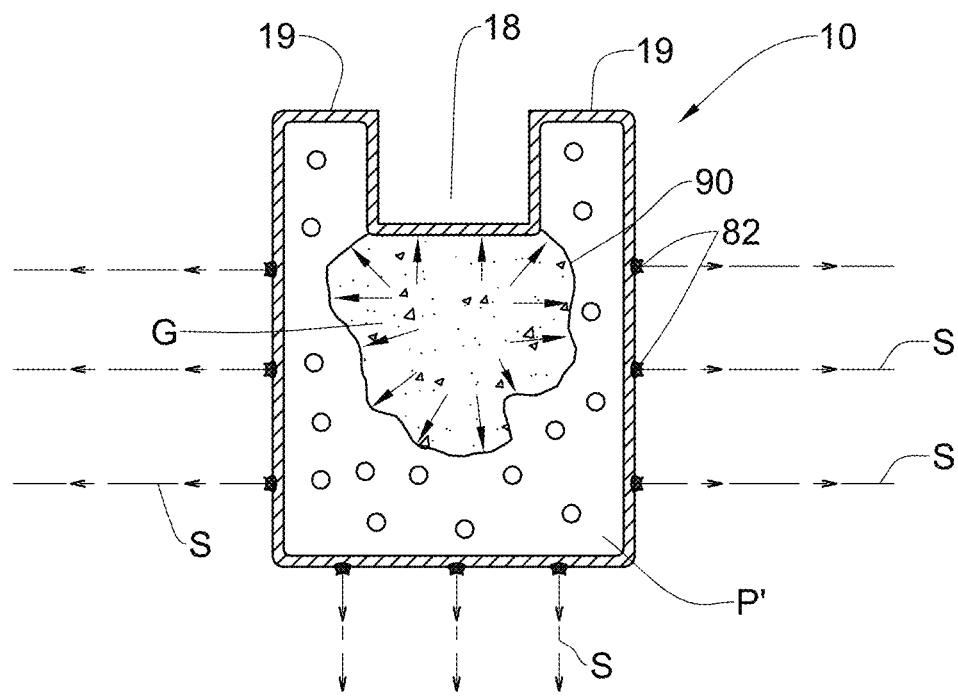
FIG. 8B is a schematic cross-section view of the fuselage shown in FIG. 8A, shown during dispersion of the payload.

Turning now to FIGS. 8A and 8B, cross-sections of the fuselage are shown during flight and during dispersion of the payload respectively.

As shown in FIG. 8A, the payload P is received within the thin-walled structure 13 of the fuselage module 10, and comprises a gas g configured for increasing the pressure within the fuselage body 12. The gas g causes a positive pressure on the walls 13 of the fuselage body 12, from the inside, designated by arrows R. The pressure acts uniformly on the walls, facilitating the structural integrity of the fuselage module 10.

It is also noted that the fuselage module 10 further comprises nozzles 82 along its external surface, and configured for discharge of the payload when so required. When the nozzles 82 are closed (as shown in FIG. 8B), the payload P cannot be dispersed, and pressure within the fuselage body 12 is maintained, facilitating the required structural integrity.

Moving now to FIG. 8B, when the UAG has reached its target area and/or when it is desired to disperse the payload P, the nozzles 82 are opened, allowing the gas G within the container to 'push' the payload P through the nozzles 82. As a result, the gas G forms a bubble 90 which, during its increase, presses on the payload P, causing it to be discharged through the nozzles 82 in streams S.

Turning now to FIG. 6A, a storage unit is shown, generally designated 70, and configured for holding therein a plurality of UAGs 1. The storage unit 70 is in the form of a cage 72, having an open front end 74 and a closed rear end 76, and a cage door 78 configured for closing the open end 74.

A storage unit 70 as shown in FIG. 6A can accommodate between 60 to 400 UAGs.

The storage unit is configured for an in-line dispensing of groups of UAGs, discharged through the open end 74 one after the other depending on their arrangement within the storage unit 70.

The following are consecutive operational stages of the UAG:

When the UAG 1 passes through the open end 74 of the storage unit 70, an electrical system is activated and a notification regarding the dispensing of the UAG and the proper operation thereof is sent to a ground control system (not shown) which is configured for monitoring, regulating and controlling the UAGs in mid-flight.

Once the UAG 1 is identified by the system, a flight program is uploaded thereto by the ground system.

As the UAG is in mid-air, the utility parachute is opened allowing the aerodynamic surfaces (winglets 53 and wing body 42) to deploy as previously discussed with respect to FIGS. 3A and 3B), and is then discarded.

The UAG switches to an automatic flight mode defined by the flight plan uploaded thereto by the ground system.

The UAG disperses its payload at the required site and crashes, since it is disposable in the first place.

The locations at which the UAGs 1 discharge their payload are designed by the ground system based on ad hoc requirements. For example, in the given fire-fighting application, it is possible to discharge the payload over a designated area, the size of which can vary in time.

As previously noted, the UAG 1 further comprises auxiliary parachutes configured for allowing the UAG to be parachuted down in case it does not meet the required flight plan (e.g. due to a rough weather regime) or due to a malfunction in any of the UAG components, preventing it from properly executing the flight plan.

Turning now to FIGS. 6B and 6C, another example of a rigid storage unit is shown generally designated 70', and equipped for accommodating less UAGs than storage unit 70. This storage unit can be used as a 'building-block' of storage units, i.e. it can also be associated with additional storage units for constituting a larger storage unit, according to the size of the carrier plane.

With particular reference to FIG. 6C, it is observed how the UAGs 1 are stacked within the storage unit, one on top of the other. In particular, UAG **1*a* is in its folded state, wing body 42*a* being folded to extend along the fuselage and spaced from a subsequent UAG 1*b*** located directly below it, having the same orientation.

Turning now to FIGS. 7A and 7B, another design embodiment of a storage unit is shown, generally designated 170 and constituting a 'flexible' storage unit as opposed to the rigid storage unit 170 previously described.

The storage unit 170 is in the form of a flexible sheet of material and is configured for being discharged from the aircraft, together with the UAGs 1, as opposed to the rigid storage unit 170 which is configured for being retained within the aircraft while the UAGs 1 are discharged therefrom.

The flexible storage unit can comprise a sheet 172 of flexible material having pockets 174 into which the UAGs 1 are fitted. In assembly, the UAGs 1 are fitted into the pockets when the sheet 172 is spread out, as shown in FIG. 7A, and the sheet is then rolled to the position shown in FIG. 7B.

The storage unit 170 further comprises an anchor point 176 which is attached to a utility parachute, so that when the entire flexible storage unit 170 is discarded from the carrier aircraft, it begins to slowly unfold, allowing gradually discharge of the UAGs 1 therefrom.

Attention is now drawn to FIGS. 9A to 10, in which another example of a UAG is shown, generally designated 200, and comprising a fuselage 210 and a wing assembly comprising two wings 250. The fuselage 210 comprises an avionic cell 220, a forward payload chamber 230 and a rear payload chamber 240.

The main avionic cell 220 comprises a hollow 221 (shown in FIG. 10) which is configured for accommodating therein equipment required at least for controlling the flight of the UAG and for the dispersion of payload, as will be detailed with regards to FIGS. 11A and 11B.

The front payload chamber 230 and rear payload chamber 240 are designed as two domed shells 232, 242 respectively, each being configured for containing therein the payload P. In the given example, the shell 232 of at least the front payload chamber 230 is a flexible diaphragm, which assumes its domed shape once it is filled with the payload and properly pressurized. The shell 242 of the rear payload chamber may also be flexible. Specifically, the under the present example, the domes shells 232, 242 are attached to the rigid avionic cell 220. The avionic cell, in turn, is associated with the main cross-beam (not shown) which holds the wings.

It is appreciated that in other embodiments, the shells, both front and rear can be made rigid as part of a unitary fuselage structure.

When the flexible diaphragm shell 232, 242 of the payload chambers 230, 240 is not filled with payload and/or pressurized thereby, it can assume a collapsed or folded state, thereby considerably reducing required storage space. According to a particular example (not shown), the collapsed diaphragm can even be inverted into the hollow 221 of the avionic cell 220, when the diaphragm is not in use.

Each wing 250 extends from a side of the fuselage 210, and comprises a main wing body 252, elevators 254, ailerons 256 and wing tip fences 258. As shown more clearly in FIG. 9B, the wings 250 have downward slope towards the rear of the UAG 200, which, aside from it aeronautic advantages, also provides an advantage with regards to stacking of the UAGs which will be discussed in detail with respect to FIGS. 12A and 12B.

Figure 9C:
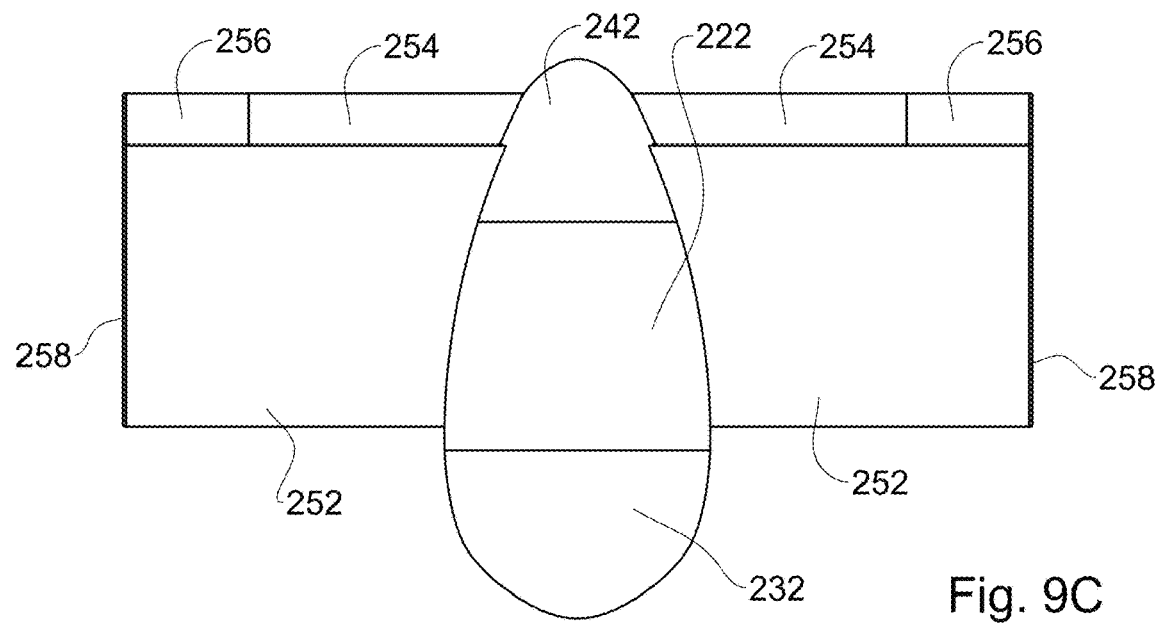
Figure 9D:
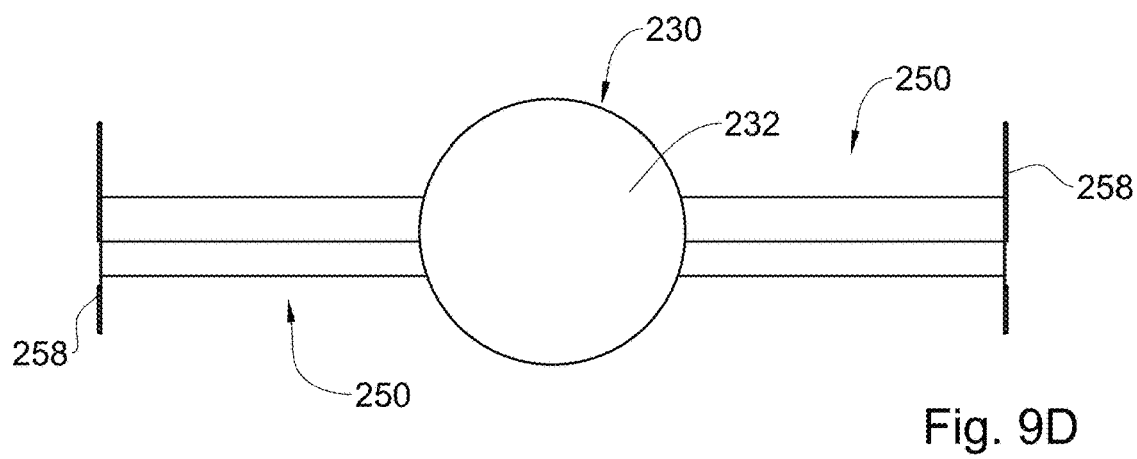
Figure 9E:
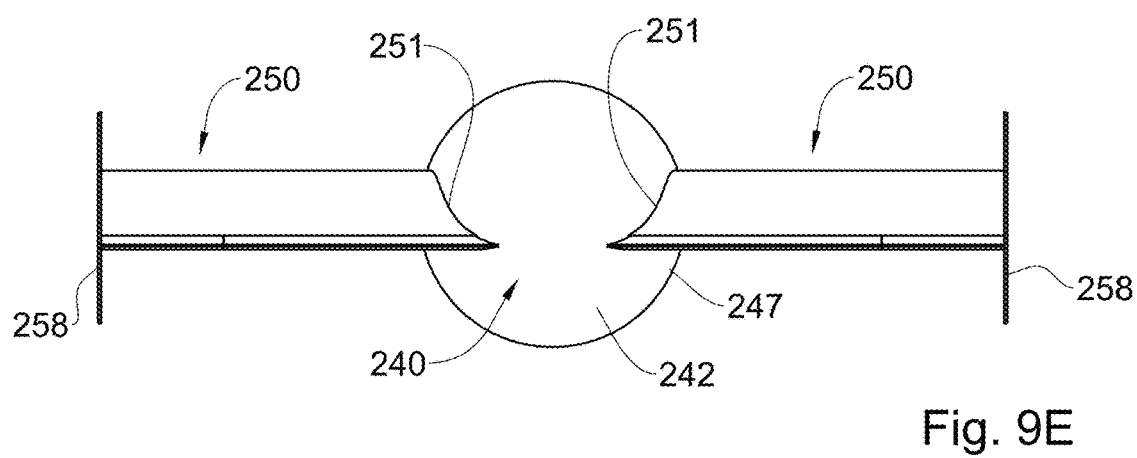
Figure 10:
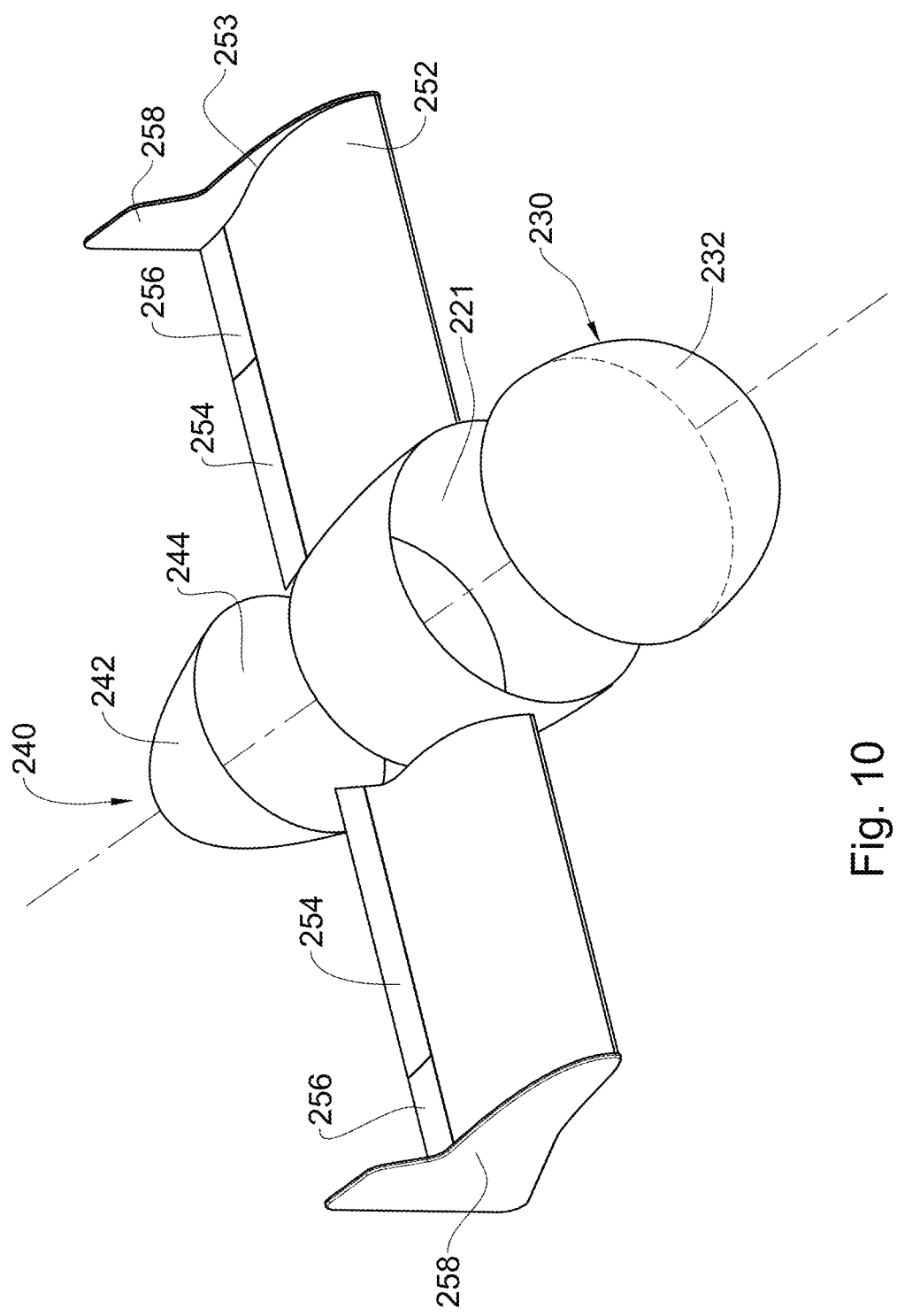
FIG. 10 is a schematic isometric exploded view of the UAG shown in FIG. 9A.

With particular attention being drawn to FIGS. 9A and 9E, the fuselage 210 comprises two filling valves 237, 247, configured for introducing payload into the front payload chamber 230 and rear payload chamber 240 respectively. According to another example which will be discussed with respect to FIG. 11A, these filling valves 237, 247 can be associated with a mutual filling valve 227 formed in the avionic cell 220.

Figure 11A:
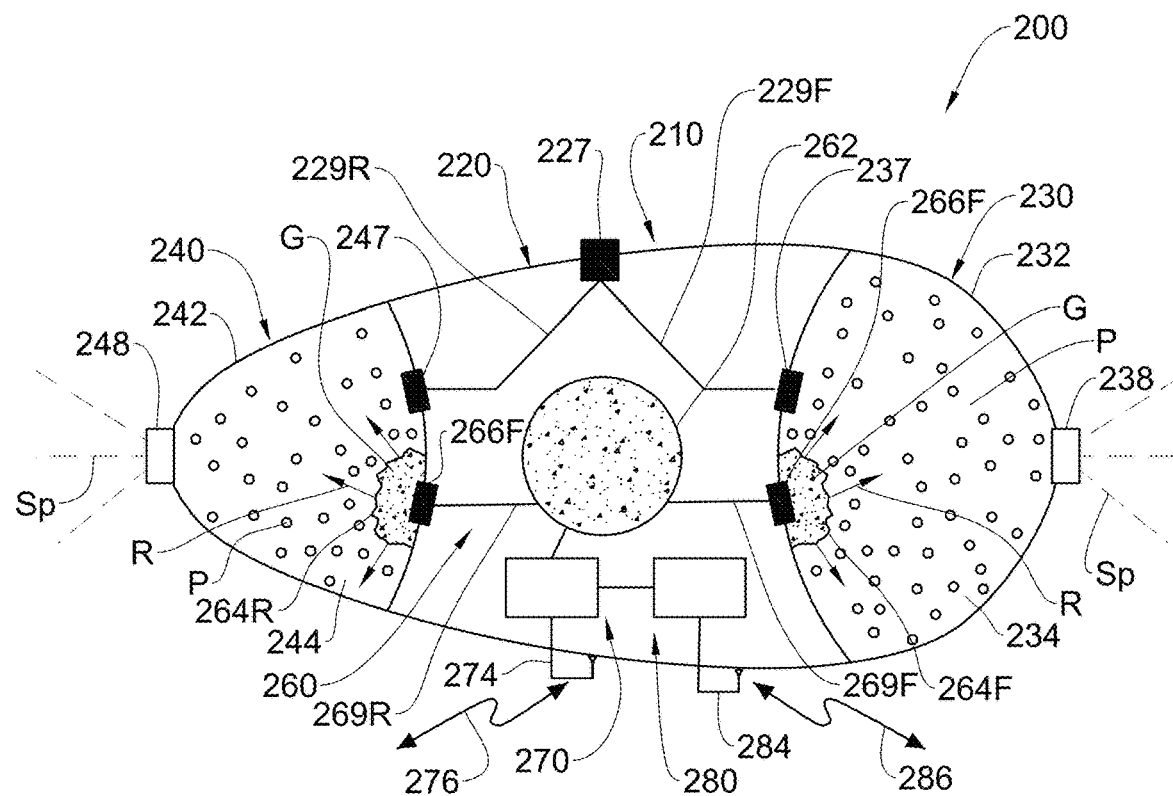
FIG. 11A is a schematic longitudinal cross-section of the UAG shown in FIG. 9A, demonstrating one example of a dispersion mechanism employed therein.

Turning now to FIG. 11A, a longitudinal cross-section of the fuselage 210 is shown, in which the avionic cell 220 accommodates an accumulator 260, a dispersion control unit 270 and a flight control unit 280.

In the cross-section shown, each of the front payload chamber 230 and the rear payload chamber 240 contains a pressurized payload P which facilitates maintaining the shape and structural integrity of the shells 232, 242.

The hull 222 of the avionic cell 220 comprises a main payload valve 227 which is associated with a front payload valve 237 and a rear payload valve 247 via appropriate tubes 229F and 229R respectively. Thus, filling and pressurizing of both payload chambers 230, 240 can be performed via a single valve 227.

Each of the payload chambers 230, 240 comprises at least one dispersion nozzles 238, 248 respectively, configured for discharge of the payload P under appropriate conditions as operation of the accumulator 260.

The accumulator 260 comprises an inflator cell 262 containing therein a pressurized/compressed gas g, and is associated with the dispersion control unit 270 and with a front inflation port $266_F$ and a rear inflation port $266_R$.

In operation, upon being prompted by the dispersion control unit 270, the inflator cell 262 is configured to rapidly release (e.g. at approx. 300 liters within 300-500 milliseconds) the compressed gas g into the inflation ports $266_F$, $266_R$, allowing it to expand (to a state G) within the payload chambers 230, 240. This is facilitated by the compressed gas g being pressured to around 50 to 250 atm. Such rapid expansion of the gas inflates the diaphragms $264_F$, $264_R$ which progressively push out the pressurized payload P through the dispersion outlets 238, 248, allowing the payload to be discharged from the UAG (designated by dashed lines $S_P$) to a distance of tens of meters, between 10 m to 50 m, forming a dispersion area around the UAG with a diameter of between 20 m to 100 m respectively.

In the present example, the pressure of the expanding gas G increases from the center outwardly as shown by arrows R and pushes the payload P, which inevitably has to be discharged through the dispersion nozzles 238, 248.

Figure 11B:
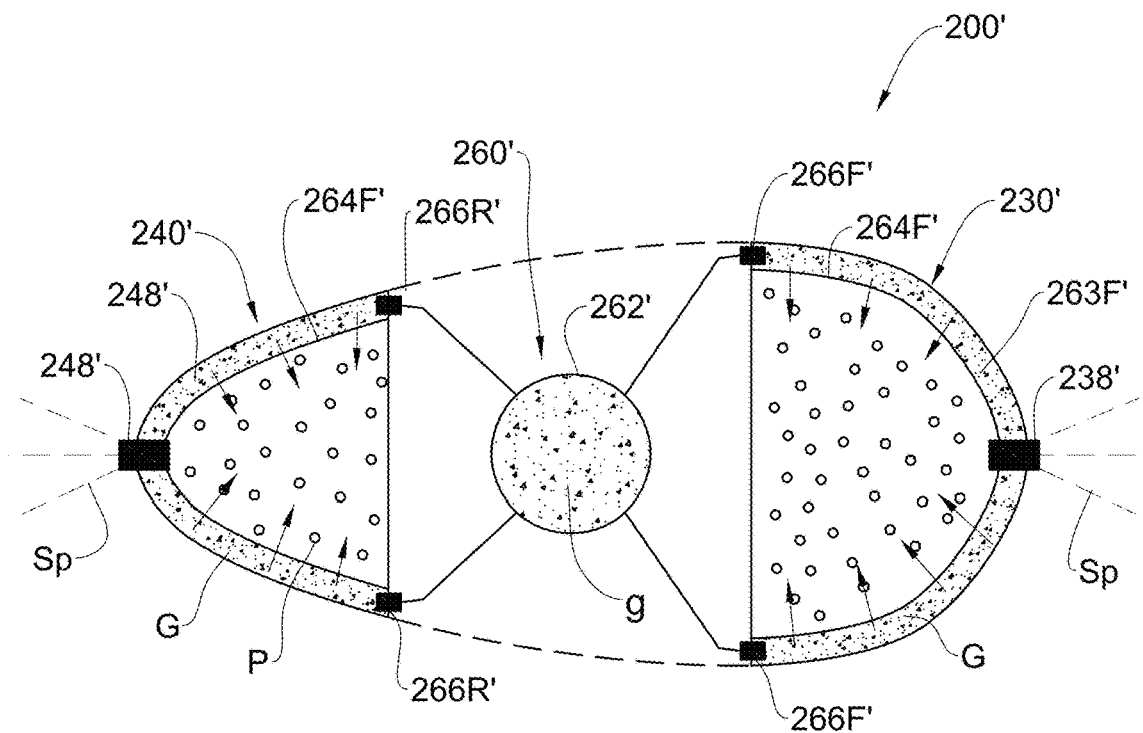
FIG. 11B is a schematic longitudinal cross-section of the UAG shown in FIG. 9A, demonstrating another example of a dispersion mechanism employed therein.

Turning now to FIG. 11B, another arrangement for the UAG is shown, generally designate 200', in which each of the shells 232', 242' also comprises a flexible inner layer $264_F'$, $264_R'$, defining intermediate inflation spaces $263_F'$, $263_R'$ respectively. The arrangement is such that each payload chamber 230', 240', comprises two inflation ports $266_F'$ and $266_R'$, associated with the inflation spaces $263_F'$, $263_R'$ respectively.

Contrary to the previous example, in operation, once the inflator cell 262' releases its pressurized gas g into the inflation ports $266_F'$ and $266_R'$, the expanded gas G presses inwardly towards the center of each payload chamber 230', 240', thereby forcing the pressurized payload P through the dispersion nozzles 238', 248'. According to other design embodiments, the accumulator 260 can be disposed within the diaphragm 264', wherein two accumulators may be required for operation, one for each dome.

In both of the examples discussed with respect to FIGS. 11A and 11B, the avionic cell 220, 220' accommodates therein the dispersion control unit 270 and the flight control unit 280. Each of the units 270, 280 is provided with a communication arrangement 274, 284 respectively, allowing it to wirelessly communicate (276, 286) with a control center in the form of one or more of the following: a computer program, application, ground controller etc.

Figure 12A:
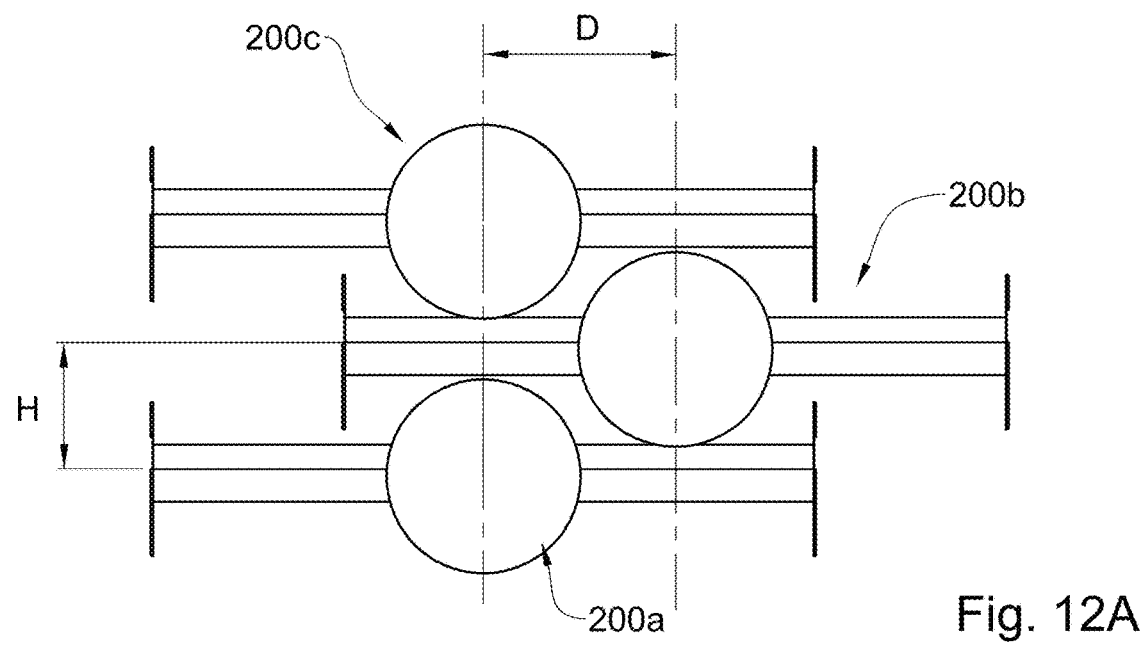
FIGS. 12A and 12B are two examples of stacking arrangements of a plurality of UAGs shown in FIG. 9A.
Figure 12B:
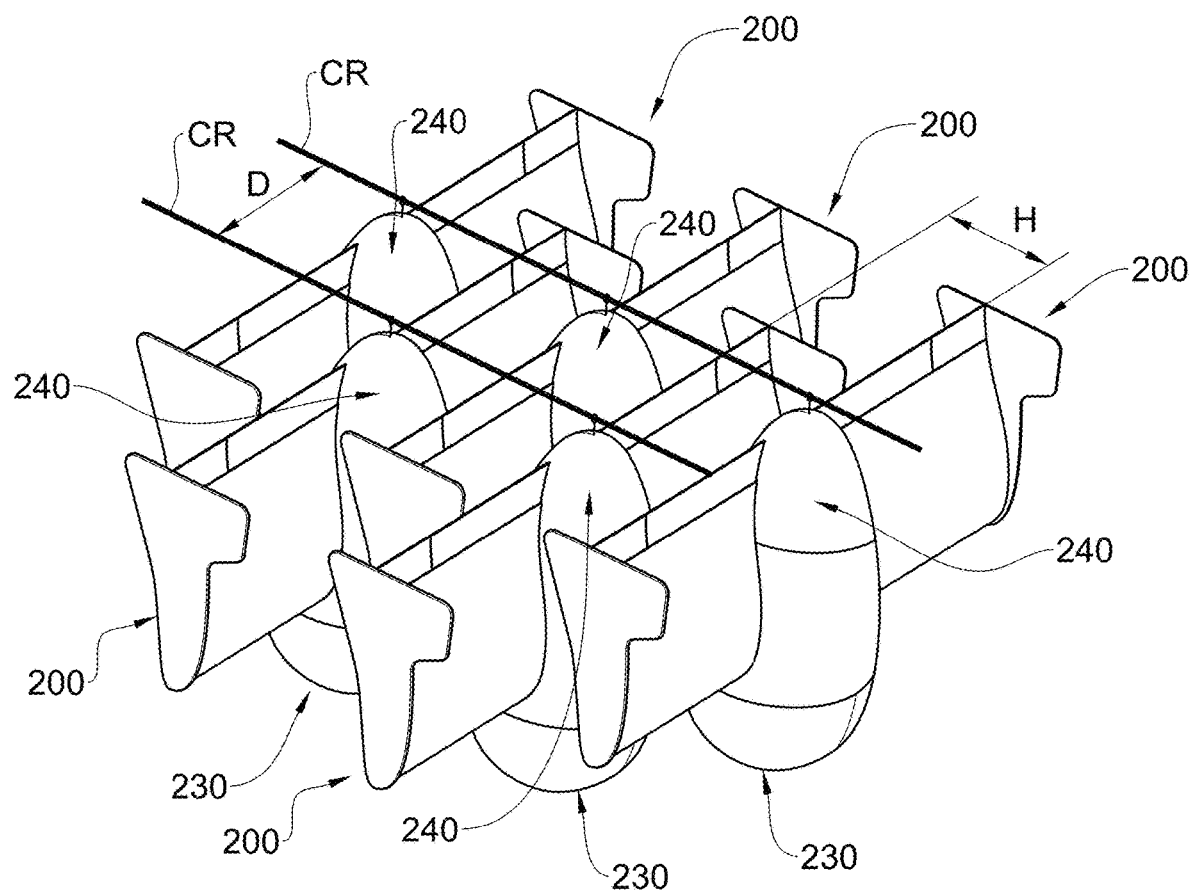

Turning now to FIGS. 12A and 12B, in operation, once a UAG is filled and pressurized, it is required to deliver the UAG to its target location (e.g. the area of a fire where the payload is dispersed). As previously explained, a plurality of UAGs can be used together, wherein it is required also to simultaneously transport such a plurality of UAGs, for example, in the cargo hull of an aircraft.

The unique geometry of the UAG shown and discussed in FIGS. 9A to 11B is such that allows a compact stacking of a plurality of such UAGs, at least during transport. In FIG. 12A, three UAGs are shown designated 200a, 200b, 200c which are stacked one on top of the other so that one the wing 250 of one UAG 200a serves as a resting surface for the fuselage 210 of its top neighboring UAG 200b. In turn, the wing 250 of the second UAG 200b serves as a resting surface for the fuselage 210 of its top neighboring UAG 200c and so on. Owing to the geometry of the wings 250 (as clearly shown in FIGS. 9B and 9E) and of the fuselage, a compact stacking of the UAGs is achieved.

Under this arrangement, each two neighboring UAGs are horizontally offset a distance D with respect to one another, D being roughly in the range of the largest cross-sectional diameter of the fuselage 210. The vertical distance between two neighboring UAGs is H, which is roughly the equivalent of about 0.5 D to 0.75 D.

Turning now to FIG. 12B, another arrangement of the UAGs is shown, in which they are arranged hanging from two carrier rails CR via the rear dome 242 thereof. Under this example, the spatial arrangement of the UAGs remains similar to that shown in FIG. 12A, but they are suspended to allow them to travel along the rails CR for easy deployment.

It is appreciated that both of the above examples show stacking of UAGs in which the wing 250 on which the UAG 200 rests alternates between right and left. However, under different storage requirements it may be more beneficial to diagonally stack the UAGs so that each UAG 200 rests always on the left (or always on the right) wing 250, thereby forming a diagonal stack (not shown).

Those skilled in the art to which this invention pertains will readily appreciate that numerous changes, variations, and modifications can be made without departing from the scope of the invention, mutatis mutandis.

The invention claimed is:

1. A disposable unmanned aerial vehicle (UAV), comprising:
   a fuselage module defines an outer surface of the disposable UAV and a container configured for storing therein a payload at a predetermined positive pressure contributing to:
      a structural integrity of the fuselage module, at least during flight, and
      a capability of dispersing said payload from the container;
   wherein, the disposable UAV is configured to have predetermined flying capabilities only when the container is pressurized;
   wherein the fuselage module is collapsible when not containing said payload; and
   wherein the container is configured so that, at least during flight, without a presence of the payload therein, the fuselage module has a first structural integrity which is lower than a second structural integrity which the fuselage module has when the container is filled, the container being incapable of maintaining the second structural integrity.

2. The disposable UAV according to claim 1, further comprising a flight module comprising aeronautical and avionic components that provide the flight module with initial flight capabilities and that are required for flight of the disposable UAV.

3. The disposable UAV according to claim 1, further comprising a flight module configured for being attached to the fuselage module.

4. The disposable UAV according to claim 1, wherein the fuselage module further comprises a dispersion mechanism utilizing the payload, in a form of at least one of the following:
   a. a nozzle arrangement; or
   b. a collapsible opening.

5. The disposable UAV according to claim 1, wherein a ratio between a weight of the container and a weight of the payload is 1:10 when the container is filled with the payload and pressurized.

6. The disposable UAV according to claim 1, wherein a ratio between a weight of the container and a weight of the payload is 1:50 when the container is filled with the payload and pressurized.

7. The disposable UAV according to claim 1, wherein a ratio between a weight of the container and a weight of the payload is 1:100 when the container is filled with the payload and pressurized.

8. The disposable UAV according to claim 1, wherein said container is made of a flexible material.

9. The disposable UAV according to claim 8, wherein said container is foldable when not containing said payload.

10. The disposable UAV according to claim 9, wherein one or more components of the disposable UAV or alternatively the entire disposable UAV, except for electronic components thereof, is made of one or more disposable materials.

11. The disposable UAV according to claim 10, wherein said disposable materials are at least any one or more of the following: cardboard and wood, glass, ceramic, or thermoplastics.

12. The disposable UAV according to claim 1, wherein the predetermined positive pressure is in a range of 3 bars to 10 bars.

13. The disposable UAV according to claim 12, wherein the container is pressurized by a CO2 gas.

14. The disposable UAV according to claim 12, wherein the container is pressurized by nitrogen.

* * * * *